United States Patent [19]

Muellenberg

[11] 4,115,016

[45] Sep. 19, 1978

[54] SHAFT FASTENING ASSEMBLY

[76] Inventor: Ralph Muellenberg, Nelkenstrasse 6, Huelchrath, Fed. Rep. of Germany

[21] Appl. No.: 852,674

[22] Filed: Nov. 18, 1977

[30] Foreign Application Priority Data

Nov. 27, 1976 [DE] Fed. Rep. of Germany ... 7637344[U]

[51] Int. Cl.² ............................................... F16D 1/06
[52] U.S. Cl. ....................................... 403/16; 403/370
[58] Field of Search .......................... 403/16, 370, 371

[56] References Cited

U.S. PATENT DOCUMENTS

| | | | |
|---|---|---|---|
| 3,590,652 | 7/1971 | Strang | 403/370 |
| 3,958,888 | 5/1976 | Mullenberg | 403/370 X |

Primary Examiner—Andrew V. Kundrat
Attorney, Agent, or Firm—Bacon & Thomas

[57] ABSTRACT

Disclosed is a shaft fastening assembly comprising a primary tapered ring having a cylindrical circumferential surface and at least one conical surface, with the primary tapered ring substantially surrounding a shaft; at least one secondary tapered ring having a cylindrical circumferential surface and a conical surface cooperating with the conical surface of the primary tapered ring; a plurality of tension bolts for tightening together the conical surfaces of the primary tapered ring and the secondary tapered ring arranged in a first circular plane surrounding the shaft; and a plurality of release bolts for releasing the conical surfaces of the primary tapered ring and secondary tapered ring arranged in a second circular plane surrounding the shaft with the first and second circular plane being located at different radial distances from the shaft to allow for the use of more tension bolts than previously possible.

6 Claims, 4 Drawing Figures

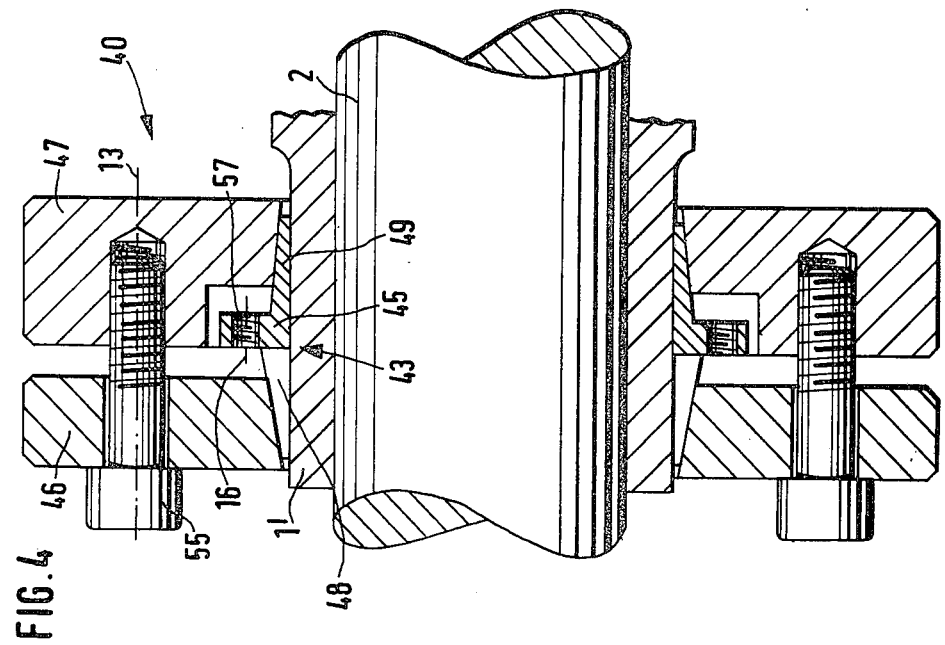
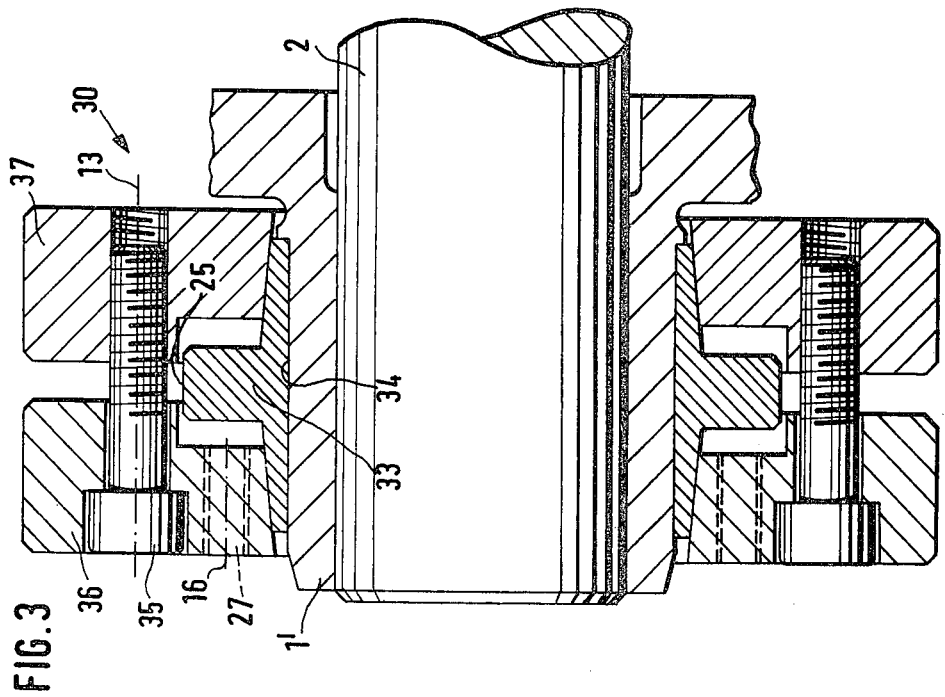

SHAFT FASTENING ASSEMBLY

BACKGROUND OF THE INVENTION

1. Field of the Invention

The invention relates to a shaft fastening assembly to connect an external structural part exhibiting a cylindrical opening with an internal structural part arranged concentrically in the cylindrical opening and possessing a cylindrical outer surface. The external structural part is more particularly a hub and the internal structural part is more particularly a shaft. The shaft fastening assemblies of the present invention also utilize axially oriented tension and release bolts for tightening and releasing ring like members of the assembly.

2. Description of the Prior Art

Shaft fastening assemblies of this type are known from U.S. Pat. No. 2,460,631 and German patent specifications Nos. 21 59 813 and 23 29 940. In the known prior art the release bolts are located between the tension bolts at the same radial distance from the shaft. The locations of the release bolts at the same radial distance cannot therefore also be occupied by tension bolts. Thus, in these devices, the number of the tension bolts is lower than the number of bolts that actually could be placed at a given radial distance from the shaft. Because the total tightening force and, correspondingly, the transferable torque depend directly on the number of bolts, it is desirable to apply the highest number of tension bolts possible to the tapered rings.

SUMMARY OF THE INVENTION

It is, therefore, an object of the invention to increase the number of tension bolts compared with the prior art. This can be accomplished according to the present invention by locating the tension bolts and the release bolts at different radial distances from the shaft. In this manner, the tension bolts can be placed in a compact arrangement at their own radial distance while the release bolts are located radially outside the area of the tension bolts and do not interfere with the tension bolts.

This arrangement renders possible a particularly advantageous design of a special form of embodiment of a shaft fastening assembly in which the first tapered ring is shaped as a double tapered ring with two conical surfaces opposed to each other and the greatest thickness of the wall of the double tapered ring is on the inside of the double tapered ring, when viewed from the axial direction. Cooperating with the double tapered ring in the present invention are two additional tapered rings, each of which cooperates with one of the conical surfaces of the double tapered ring and each of which can be tightened with the aid of the tension bolts against each other. At the same time, the double tapered ring has a radially extending member between the additional tapered rings in the area of the tension bolts. This member is a radial circumferential extension containing passage holes extending in a direction parallel to the axis of the shaft for receiving the tension bolts. At locations distributed around the circumference, threaded borings are present in the tapered ring located on one side of the circumferential extension. These borings are for the release bolts. Similar threaded borings are present at locations in and distributed around the circumference of the circumferential extension. These borings are opposed by locations without holes, passageways, or borings on the tapered ring located on the other side of the circumferential extension and by locations with passage holes in the tapered ring on the first side of the circumferential extension.

In such a shaft fastening assembly the invention can be realized by placing the tension bolts at an outer radial distance and the release bolts at an inner radial distance from the shaft letting the circumferential extension protrude radially only within the radial location of the tension bolts. At lease one of the tapered rings is advantageously placed to partially overlap the circumferential extension with a circumferential shoulder provided radially outside the extension in the axial manner.

In this fashion a particularly simple and at the same time especially efficient shaft fastening assembly is achieved. The outer area of the ring member can accomodate a complete circle of tension bolts. Due to the fact that the release bolts are placed at a distance inside, it is not necessary for the circumferential extension to protrude into the area of the tension bolts. This considerably simplifies the manufacture of the double tapered ring, the more so since the passage holes for the tension bolts in the circumferential extension necessary in known devices (as shown in German Patent specification 23 29 940) are eliminated. Because of the design of the circumferential extension the two tapered rings are able to overlap the circumferential extension to some extent and thus expand to a wider extent so that the contact surface on the cylindrical circumference is increased and, correspondingly, the unit pressure decreased. This makes it possible, for example, to design a hub to be fastened on a shaft with the shaft fastening assemply having thinner walls, because the annular stresses to be supported by it are lower.

If both tapered rings are designed with overlaping members, their axial shoulders overlap the circumferential overhang on both sides; however, a gap must still remain in untightened position between their front surfaces in order to make the tightening of the tapered rings against each other possible.

DESCRIPTION OF THE DRAWINGS

The drawing demonstrates three examples of the preferred embodiment of the invention.

FIGS. 3 and 4 show partial longitudinal sections through additional forms of the invention.

DETAILED DESCRIPTION OF THE INVENTION

Figure 1:
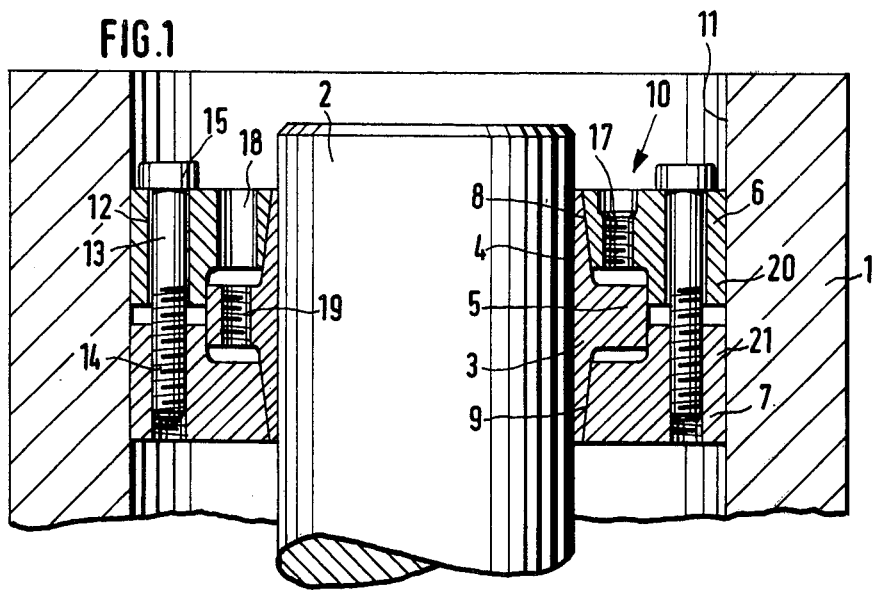
FIG. 1 shows a partial longitudinal section through the shaft fastening assembly of the invention in an application involving the fastening of a hub on a shaft.

Referring to FIG. 1, it is seen that hub 1 is to be fastened to shaft 2 with the aid of the shaft fastening assembly designated generally by 10. The shaft fastening assembly 10 includes a double tapered ring 3. The cylindrical inner circumferential surface 4 of double tapered ring 3 contacts the outer surface of shaft 2. The wall of double tapered ring 3 is thickest in its center portion where a circumferential extension 5 protrudes outward radially.

Two tapered rings 6 and 7 are positioned between double tapered ring 3 and hub 1. The inner conical surfaces 8 and 9 of tapered rings 6 and 7 are in contact with the outer conical surfaces of double tapered ring 3. The outer circumferential surface of tapered rings 6 and 7 is cylindrical in shape and communicates with hub 1 at the inside surface 11.

Figure 2:
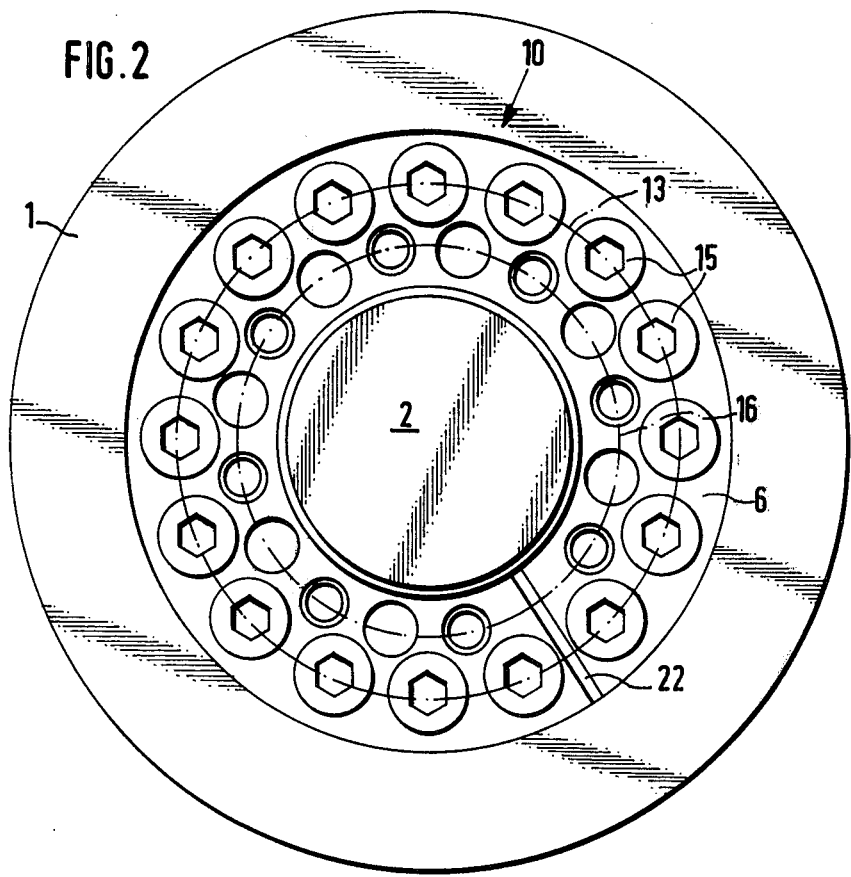
FIG. 2 shows a top view in accordance with FIG. 1.

Tapered ring 6 has passage holes 12 arranged in a circle 13 concentric with the circumference of shaft 2 (see FIG. 2). Tapered ring 7 possesses threaded borings 14 also arranged in a circle concentric with the circumference of shaft 2 and being of the same radius as concentric circle indicated at 13. Tension bolts 15 are placed through passage holes 12 and screwed into threaded borings 14 from the upper side in FIG. 1. In this arrangement tension bolts 13 pull the tapered rings 6 and 7 against each other. At the same time tapered rings 6 and 7 are forced to slide along the outer conical surfaces of double tapered ring 3, resulting in a widening of the shaft fastener assembly 10 and thereby leading to the securing of hub 1 on shaft 2 by means of frictional resistance.

A plurality of threaded borings 17 and an alternating plurality of passage holes 18 are located in tapered ring 6. The arrangement of borings 17 and holes 18 in tapered ring 6 forms a circle 16 concentric with the circumference of shaft 2 but having a radius smaller than concentric circle 13, i.e., borings 17 and holes 18 are arranged between passage holes 12 and shaft 2 (see FIG. 2). Threaded borings 17 are faced on the circumferential extension 5 by locations without borings, while the passage holes 18 in turn are faced in the circumferential extension 5 by threaded borings 19. No borings or holes are located in the corresponding areas of tapered ring 7.

As shown in the drawings, the borings 17 and holes 18 are arranged for cooperation with release bolts which are not shown in the drawings. By screwing release bolts into the threaded borings 17, tapered ring 6 can be separated from double tapered ring 3.

The radial distances of concentric circles 13 and 16 is chosen so that the release bolts do not interfere with the tension bolts 15. In this manner, the tension bolts can thus be set in close proximity to each other.

The circumferential extension 5 protrudes only into the area of the release bolts and not into the location of the tension bolts. For this reason, the tapered rings 6 and 7 can be equipped with axial shoulders 20 and 21 radially outside the circumferential extension 5. The axial shoulders 20 and 21 overlap the circumferential extension in the embodiment of FIG. 1, but both tapered rings 6 and 7 need not possess axial shoulders that overlap the circumferential extension as can be seen from FIG. 4. When both axial shoulders do overlap, the external circumferential surface of the tapered rings 6 and 7 in contact with the inside surface 11 of hub 1 is enlarged and the local unit pressure reduced.

In an advantageous embodiment, the tapered rings 6 and 7 may be split to allow a greater radial expansion in the longitudinal direction as shown at 22 in FIG. 2.

The embodiment of the invention demonstrated in the foregoing example demonstrates a double tapered ring forming the inner annulus. However, the invention is equally suitable for use in shaft fastening assemblies with external double tapered rings and also in shaft fastening assemblies with simple tapered rings.

FIG. 3 discloses yet another advantageous embodiment of the invention. Here the shaft fastening assembly 30 is not placed between the shaft 2 and the associated hub, but the hub 1' is set directly on the shaft 2 and compressed and secured on the shaft by the shaft fastening assembly 30 from the outside. The assembly thus surrounds the hub 1'. In this embodiment (FIG. 3), the torque is transmitted directly from the hub 1' to the shaft 2.

The shaft fastening assembly 30 includes a double tapered ring 33, positioned at its cylindrical inner circumferential surface 34 on the outer circumference of hub 1'. Double tapered ring 33 has self-retaining conical surfaces on the outer circumferential surface against which additional tapered rings 36 and 37 may be positioned. These additional rings otherwise have configurations similar to tapered rings 6 and 7 of FIGS. 1 and 2.

In the case of shaft fastening assembly 40 of FIG. 4, hub 1' again is secured on the shaft 2. Shaft fastening assembly 40 is again positioned directly at the outer surface of hub 1'. While tapered rings 36 and 37 of FIG. 3 are mirror images of each other, and are positioned against a one-piece double tapered ring 33 which is symmetrical with respect to a transverse center plane, double tapered ring 43 of FIG. 4 is divided into a self-retaining member 49 displaying circumferential extension 45 and a non self-retaining member 48. The conical surface of member 48 has its thicker end directly adjacent the circumferential extension 45. Member 49 is associated with tapered ring 47, which overlaps circumferential extension 45 in a manner similar to tapered rings 6 and 7 in FIGS. 1 and 2. Member 48 is associated with tapered ring 46, which is automatically released upon the release of tension bolts 53. This in turn renders release bolts 57 accessible from the left side in FIG. 4 so that tapered ring 47 can be separated from the member 49 of double tapered ring 43.

In the embodiments disclosed in FIGS. 3 and 4, tension bolts 35 and 55 are again arranged in a concentric circle 13 of different radial distances from shaft 2 than the concentric circle 16 of the bolts (not shown) which are to be screwed into threaded bores 27 and 57. The radial distance from shaft 2 of the concentric circle 16 is less than the radial distance from shaft 2 of concentric circle 13, the difference in radial distances being sufficient to prevent hinderance by the release bolts in the operation of the tension bolts.

While the above described specific embodiments set forth the preferred manner of accomplishing the objects and advantages of the present invention, it may be readily recognized that other equivalent components may be utilized in substitution for the specific parts of the shaft fastening assembly described above. The invention may therefore be summarized as a shaft fastening assembly comprising a primary tapered ring having a cylindrical circumferential surface and at least one conical surface, with the primary tapered ring substantially surrounding a shaft; at least one secondary tapered ring having a cylindrical circumferential surface and a conical surface cooperating with the conical surface of the primary tapered ring; a plurality of tension bolts for tightening together the conical surfaces of the primary tapered ring and the secondary tapered ring arranged in a first circular plane surrounding the shaft; and a plurality of release bolts for releasing the conical surfaces of the primary tapered ring and secondary tapered ring arranged in a second circular plane surrounding the shaft with the first and second circular plane being located at different radial distances from the shaft. As specified in The Description of the Preferred Embodiment, the primary and secondary tapered rings, tension and release bolts and particular configuration of the ring members may have particularly advantageous configurations and arrangements. Generally, it may be stated that the arrangement of a plurality of tension bolts in a circular plane surrounding the shaft allows for the utilization of more tension bolts than previously achievable in shaft fastening assemblies.

What is claimed is:

1. A shaft fastening assembly comprising:
   a double tapered ring having a cylindrical circumferential surface, and two opposing conical surfaces on opposite sides of a radially extending protrusion, said double tapered ring substantially surrounding a shaft;
   two secondary tapered rings each having a cylindrical circumferential surface, and a conical surface cooperating with a different conical surface of said double tapered ring, and a circumferential shoulder portion on at least one of said secondary tapered rings overlapping said radially extending protrusion on said double tapered ring;
   a plurality of tension bolts for tightening together said conical surfaces of said double tapered ring and said secondary tapered ring arranged in a first pitch circle surrounding said shaft; and
   a plurality of release bolts for releasing said conical surfaces of said double tapered ring and said secondary tapered rings arranged in a second pitch circle surrounding said shaft;
   said first and second pitch circles being located at different radial distances from said shaft.

2. The shaft fastening assembly of claim 1 wherein each of said secondary tapered rings contains a circumferential shoulder portion overlapping said radially extending protrusion of said double tapered ring.

3. The shaft fastening assembly of claim 2 wherein at least one of said release bolts is positioned in a threaded boring in said radially extending protrusion.

4. The shaft fastening assembly of claim 3 wherein said release bolts in said radially extending protrusion are accessible through holes in one of said secondary tapered rings and are screwed against the other of said secondary tapered rings to force the other of said secondary tapered rings apart from said primary tapered ring.

5. The shaft fastening assembly of claim 4 wherein at least one of said release bolts is positioned in a threaded boring in said secondary tapered ring and is screwed against said radially extending protrusion to force said secondary tapered ring apart from said primary tapered ring.

6. The shaft fastening assembly of claim 5 wherein said first circular plane comprising said plurality of tension bolts is a greater radial distance from said shaft than said second circular plane comprising said plurality of release bolts.

* * * * *